United States Patent [19]

Nagamoto et al.

[11] Patent Number: 5,446,453
[45] Date of Patent: Aug. 29, 1995

[54] RESIDENTIAL FACILITY CONTROL SYSTEM

[75] Inventors: Shunichi Nagamoto, Nara; Takeshi Muramatu, Shizuoka; Yasuo Yoshimura, Yamatokoriyama; Masahiro Yamamoto, Nara, all of Japan

[73] Assignee: Matsushita Electric Industrial Co., Ltd., Kadoma, Japan

[21] Appl. No.: 43,560

[22] Filed: Apr. 7, 1993

[30] Foreign Application Priority Data

Apr. 9, 1992 [JP] Japan .................................. 4-088531
Apr. 9, 1992 [JP] Japan .................................. 4-088532

[51] Int. Cl.$^6$ .............................................. G05B 23/02
[52] U.S. Cl. .......................... 340/825.06; 340/825.69
[58] Field of Search ..................... 340/825.06, 825.17, 340/825.14, 825.44, 825.69, 825.72, 870.39, 870.28; 455/343, 127

[56] References Cited

U.S. PATENT DOCUMENTS

| | | | |
|---|---|---|---|
| 4,577,315 | 3/1986 | Otsuka | 340/825.44 |
| 4,688,036 | 8/1987 | Hirano et al. | 340/825.69 |
| 4,839,645 | 6/1989 | Lill . | |
| 4,843,384 | 6/1989 | Ide et al. | 340/825.69 |
| 5,150,954 | 9/1992 | Hoff . | |

FOREIGN PATENT DOCUMENTS

| | | | |
|---|---|---|---|
| 0245024 | 11/1987 | European Pat. Off. . | |
| 0363998 | 4/1990 | European Pat. Off. . | |
| 5777671 | 10/1980 | Japan . | |
| 63-20071 | 7/1991 | Japan . | |
| 4-61432 | 2/1992 | Japan . | |
| 44113796 | 4/1992 | Japan | 340/825.69 |

273811   7/1927   United Kingdom .

Primary Examiner—Donald J. Yusko
Assistant Examiner—Edwin C. Holloway, III
Attorney, Agent, or Firm—Spencer, Frank & Schneider

[57] ABSTRACT

A residential facility control system transmits data as a radio signal between host and subsidiary apparatus. Transmitting and receiving devices of the host and subsidiary apparatus are reduced in power consumption. A transmitting circuit of the transmitting device of the transmitting and receiving apparatus is supplied with power from a transmitting circuit power source control in synchronization with a first timing signal from a first timer for a period of time which is necessary for transmission. A receiving circuit of the receiving device of the transmitting and receiving device is supplied with power from a receiving circuit power source control for a shorter period of time in synchronization with a second timing signal from a second timer which is synchronized with the first timing signal. When the receiving circuit receives a signal for the shorter power supply period of time, the receiving power source control maintains power supply to the receiving circuit for a period of time which is necessary to receive the signal. Synchronization between the first and second timing signals is achieved by initializing the second timer by way of timer synchronization device each time when the receiving device receives an effective signal or by regularly transmitting a forced synchronization signal to the receiving device from a forced synchronization signal generator provided in the transmitting device and by receiving the synchronization signal at the receiving device to initialize the second timer by way of the timer synchronization device.

8 Claims, 9 Drawing Sheets

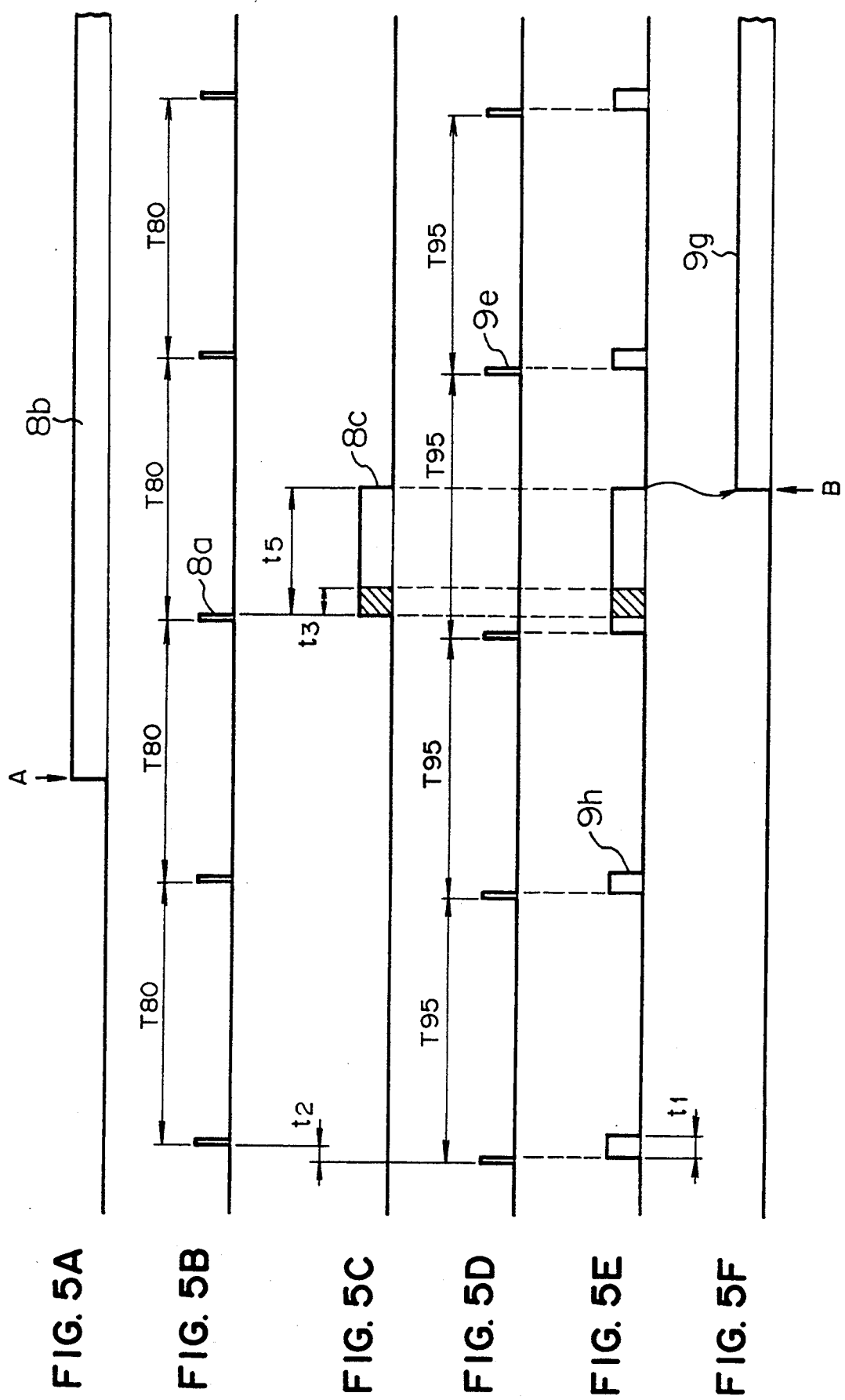

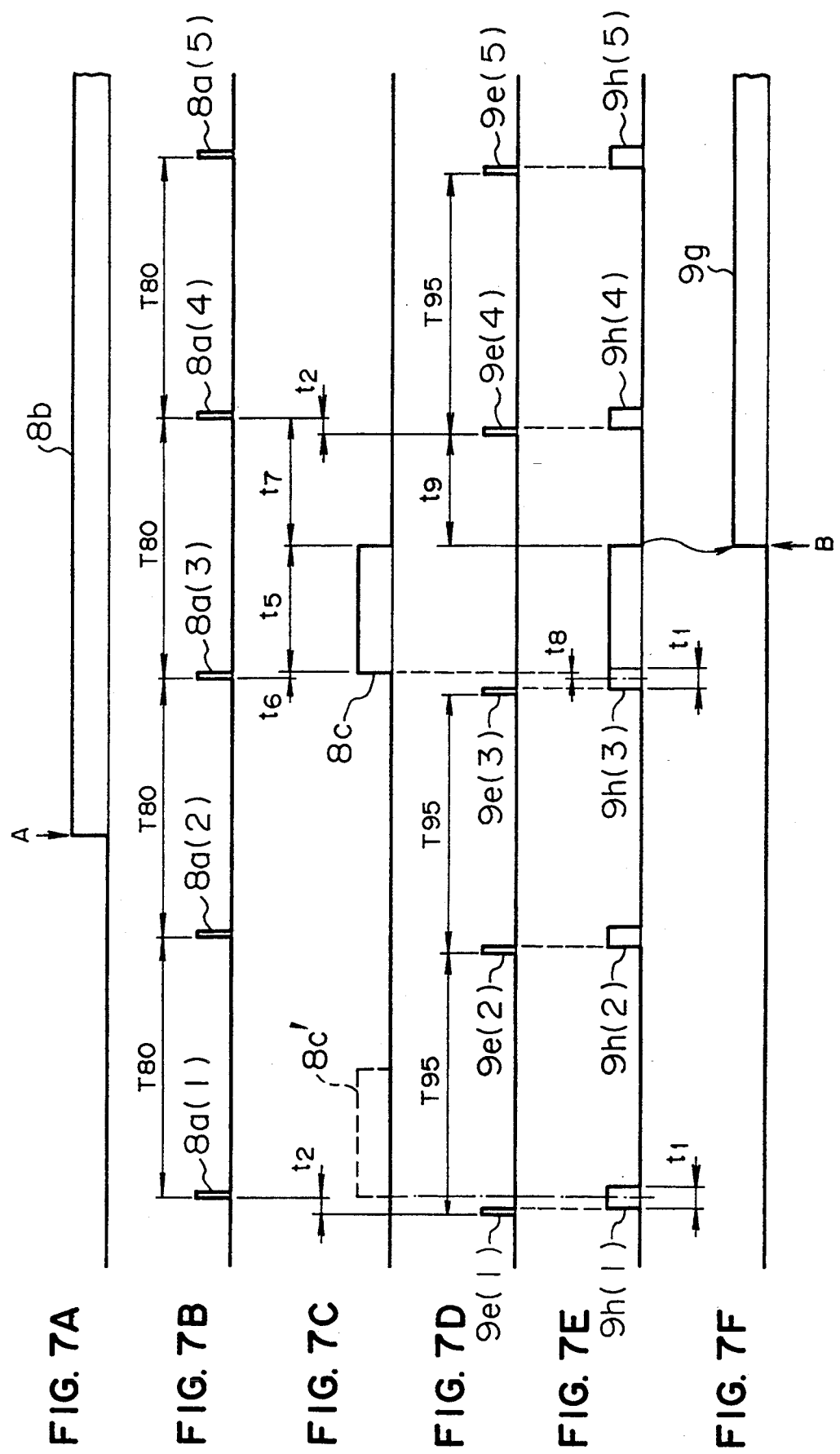

RESIDENTIAL FACILITY CONTROL SYSTEM

BACKGROUND OF THE INVENTION

1. Field of the Invention

The present invention relates to a residential facility control system including host and subsidiary apparatus, such as a hot water supply system installed in a housing including a control therefor (host apparatus) and one or more remote controllers (subsidiary apparatus) or an automatic metering terminal system including a terminal network control (host apparatus) for transmitting metering data from one or more metering terminals (subsidiary apparatus), such as a gas meter and water supply meter installed in each housing, to a metering center. The present invention more particularly relates to a residential facility control system having a radio control capability including transmitting and receiving devices for transmitting data between host and subsidiary apparatus.

2. Description of Related Art

A prior art residential facility control system including transmitting and receiving devices includes a remote control device for gas combustion appliances which is disclosed in Japanese Unexamined Utility Model Publication Jikkai-Sho 57-77671. Ignition of the gas combustion appliance is conducted in response to a radio signal from a wireless remote controller. The gas combustion appliance then sends a radio signal representative of ignition of a pilot burner and each burner back to the wireless remote controller. However, a power source for the wireless remote controller is not disclosed and the structure for reducing the power consumption of the wireless remote controller is not disclosed. Therefore, if batteries are used as a power source, a problem will arise that batteries having a high capacity have to be used or frequently exchanged with fresh batteries.

Another prior art residential facility control system including transmitting and receiving apparatus includes a data acquisition system which is disclosed in Japanese Examined Patent Publication Tokko Sho 63-20071. When a calling instruction from a metering center is transmitted via a telephone line to a terminal network control unit (hereinafter abbreviated T-NCU) installed in each house in an automatic metering system using a telephone line, the T-NCU transmits radio waves via radio transmitting and receiving device request metering terminals such as a gas meter, water supply meter, or power meter installed in the house to transmit the metering data. Transmitting and receiving units of the metering terminals then receive the metering data and transmit radio waves representing it to the T-NCU. Use of dry battery cells and solar batteries as a power source for the metering terminal is disclosed. Since no structure for reducing the power consumption of the metering terminals is disclosed, the same problem as that of the above mentioned gas combustion appliances will arise. Use of batteries having a high capacity makes the residential facility control system larger in size and weight and makes its installation more difficult in comparison with compact and light weight similar systems. In order to make the frequent exchange of batteries possible, the residential facility control system has a structure such that batteries are exchangeable. Accordingly, the structure becomes complicated. Since various meters used for metering terminals and hot water supply equipment are usually installed outdoors, the battery exchangeable structure should be resistant to humidity and water. This makes the system structure more complicated.

An automatic metering system is disclosed in Japanese Unexamined Patent Publication No. Tokkai-Hei 4-61432 as a further prior art residential facility control system including transmitting and receiving apparatus. A radio transmitting and receiving device is provided which is coupled with metering terminals and data acquisition devices such as a gas meter, a water supply meter, and a power meter installed in each house via a radio transmission path. Measurement data of a number of metering terminals are collected by the data acquisition devices via the radio transmitting and receiving device on a polling basis. No power source for the metering terminals is described. Since a structure for reducing the power consumption is also not disclosed similarly to the data acquisition system described in the above mentioned Japanese Examined Patent Publication Tokko-Sho 63-20071, the same problem arises.

In a prior art receiver unit for a transceiver in which power consumption is reduced, power is generally periodically supplied to a receiver unit during only a short time slot like the pager disclosed in U.S. Pat. No. 5,150,954. The pager unit which receives a transmission signal including paging and timing data comprises power supply starting means for supplying power to a receiver, a decoder, a first synchronization unit and a display unit for use during only a time slot assigned to the pager unit; the receiver for detecting a transmission signal; the first synchronization unit which responds to a timing data to synchronize with the timing data; and a display unit for displaying the detection of the page. In the pager unit, time information is included in the transmitted signal from a central station. When the pager receives the signal, the pager unit causes a timer to synchronize by using time information included in the signal. This enables the timer which periodically supplies power to the receiver and decoder during a short time slot to be synchronized with the central station. Reduction in power consumption can be achieved since power is periodically supplied to the receiver or decoder during the short time slot for which the timer is set to receive. However, it is essential that the timing data be included in the transmitted signal in the pager. This makes the length of the transmitted signal longer than that of a transmitted signal including no timing data. Correspondingly, the time of signal reception and power supply to the receiver is increased, resulting in high power consumption. Since the pager does not include any transmitter unit, the reduction in power consumption of the transmitter unit of the pager is not disclosed. Synchronization between transmission and reception in such a manner is possible if the transmission and reception is regularly conducted. However, there is the possibility that out-of-synchronization will occur if transmission and reception is irregularly conducted. In other words, if transmission and reception is conducted at time intervals at which out-of-synchronization does not occur, synchronization is achieved by timing data included in the transmitted signal. If transmission and reception is irregularly conducted, transmission and reception may be conducted even though synchronization therebetween is not achieved. Since the receiver can not receive the transmitted signal in such a case, the timing data of the transmitted signal can not be read, resulting in out-of-synchronization. Transmission and reception becomes impossible.

SUMMARY OF THE INVENTION

It is an object of the present invention to provide a residential facility control system having a radio control capability in which consumption of batteries used as a power source is lowered by reducing power consumption of a transmitting and receiving device of a radio control device of a residential facility control system and the frequency of battery exchange is reduced if the batteries have the same capacity with conventional batteries, and batteries having a smaller capacity can be used if the frequency of battery exchange is the same as in the case of the conventional system.

It is another object of the present invention to provide a residential facility control system including a receiver unit which is capable of positively receiving a transmitted signal while lowering the consumption of batteries used as a power source.

It is a further object of the present invention to provide a residential facility control system having a radio control capability which can positively synchronize transmission with reception without adding special timing data to the transmission data, that is, without extending the transmission signal.

A first embodiment of the present invention includes a residential facility control system having a radio control capability comprising host and subsidiary apparatus;

said host apparatus including:
first timer means for periodically outputting a first timing signal having a predetermined period;
transmission control means for starting transmission operation based upon said first timing signal in response to a signal from a transmission data generating unit which generates data to be transmitted and for outputting a predetermined transmission data and a power source control signal;
a transmission circuit and transmitting antenna means for transmitting said predetermined transmission data from the transmitting antenna as a radio signal; and
transmitting circuit power source control means for controlling a power supply to said transmitting circuit in response to said power source control signal;

said subsidiary apparatus including;
receiving antenna means for receiving a radio signal which is transmitted from said transmitting antenna;
a receiving circuit for receiving a transmission signal from said host apparatus via said receiving antenna;
second timer means for periodically outputting a second timing signal having a period which is substantially equal to the period of said first timing signal which is divided by an integer;
reception control means for determining whether or not there is a reception signal from said receiving circuit to output a reception signal in synchronization with said second timing signal and for outputting a receiving circuit power source control signal to control a power supply to said receiving circuit in response to said second timing signal; and
receiving circuit power source control means for intermittently activating said receiving circuit by intermittently supplying power to said receiving circuit in response to said receiving circuit power source control signal.

Since the transmitting circuit transmits the transmission data via the transmitting antenna in synchronization with the first timing signal only when transmission data is generated from the transmission data generating unit in accordance with the above mentioned structure, power consumption can be reduced in comparison with a case in which the transmitting circuit is always powered. Since the receiving circuit is periodically powered in synchronization with the second timing signal for a short period of time so that it is rendered into an active state to detect a reception signal, power consumption can be reduced in comparison with the case in which the receiving circuit is always powered. It is apparent from the foregoing description that power consumption of the transmitting and receiving device can be reduced. Accordingly, the capacity of the power source which the host and subsidiary apparatus have to include can be made lower so that the physical size of the power source can be reduced. Therefore, the host and subsidiary apparatus can be miniaturized. If the batteries have the same capacity as those used in a conventional system, the frequency of battery exchange can be reduced. If the frequency of battery exchange is the same as in case of the conventional system, batteries having a smaller capacity can be used.

A second embodiment of the present invention includes a timer synchronizing means which starts the operation in response to reception of data from the reception control means and initializes the second timer means after a predetermined period of time.

In accordance with this embodiment, synchronization between the first and second timing signals can be easily achieved without adding timing data to the transmission data. Since this can shorten the length of the transmission signal in comparison with the case in which timing data is added, the period of time for which transmitting and receiving circuits are powered on for transmission and reception can be shortened, so that power consumption can be further reduced.

A third embodiment of the present invention includes in either the transmitting devices of the host or subsidiary apparatus, a forced synchronization signal generating means for periodically outputting to the transmission control means a forced synchronization signal for the synchronization between transmission and reception.

This can eliminate the danger that out-of-synchronization between transmission and reception may occur when data to be transmitted is not transmitted from the transmission data generating unit for an extended period of time.

The above and other objects, features and advantages of the present invention will become more apparent by reading the description of preferred embodiments of the present invention.

BRIEF DESCRIPTION OF DRAWINGS

FIGS. 5A to 5F are timing diagrams showing signals in the transmitting and receiving device shown in FIG. 3;

FIGS. 7A to 7F are timing charts showing signals in the transmitting and receiving device shown in FIG. 5.

DESCRIPTION OF THE PREFERRED EMBODIMENT

Figure 1:
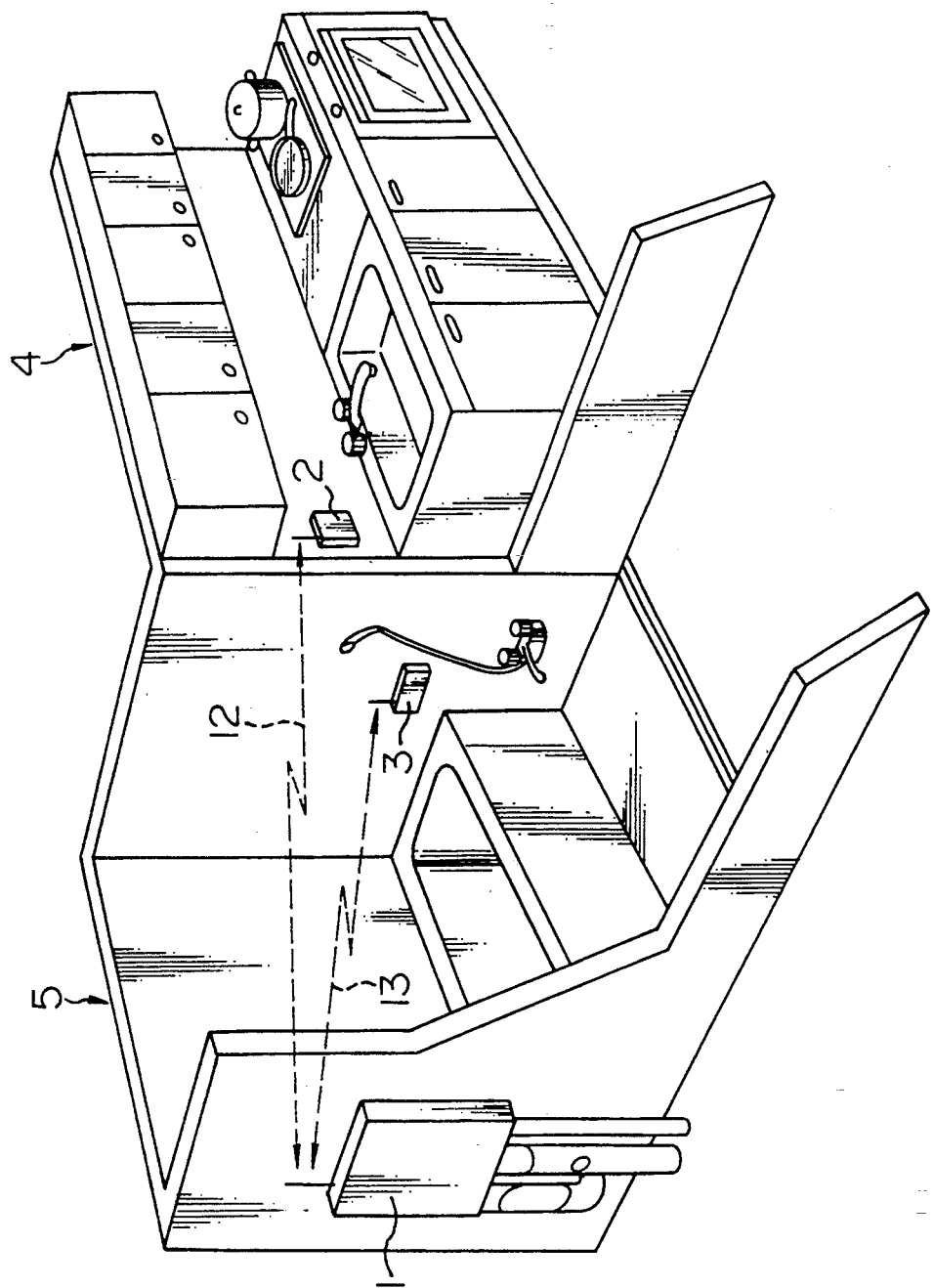
FIG. 1 is a perspective view showing a hot water supplying apparatus in an embodiment of the present invention.

Referring to FIG. 1, a hot water supplying apparatus, which is an example of a residential facility control system having a radio control capability, comprises a gas heated hot water supplying apparatus 1 having functions of a host apparatus of a radio control device and remote controllers 2 and 3 which are a part of a plurality of subsidiary apparatus. The gas heated hot water supply apparatus 1 is installed outdoors or in a basement. The remote controllers 2 and 3 are installed in a kitchen 4 and a bath room 5 which are supplied with hot water from the gas heated hot water supplying apparatus 1. A user instructs to start or stop the operation of the gas heated hot water supply apparatus 1 or presets the temperature of supplied hot water by operating an operation unit of the remote controller 2 or 3 and is capable of monitoring the operation of the gas heated hot water supply apparatus 1 on a display of the remote controller 2 or 3. In other words, the remote controller 2 or 3 transmits radio signals 12, 13 to the gas heated hot water supplying apparatus 1 via a low power consumption transmitting and receiving device of the present invention for instructing the hot water supplying apparatus 1 to start or stop its operation or to control the gas consumption so as to heat the hot water supply to a preset temperature. The hot water supplying apparatus 1 transmit the radio signal 12, 13 representing the operating condition of the apparatus to remote controller 2, 3 by means of the low power consumption transmitting and receiving device of the present invention. The remote controller 2, 3 receives the radio signal 12, 13 by means of the transmitting and receiving device and displays the information on the display so that the user can identify it. In the present embodiment, the gas heated hot water supplying apparatus 1 is supplied with commercial power since a fan-motor for feeding air and combustion amount adjusting means for controlling the combustion amount require comparatively high power. Therefore, the transmitting and receiving device in the above apparatus is also supplied with commercial power. On the other hand, the remote controller 2 or 3 is powered with batteries so that the users can freely install it in a position where the users can easily operate the controller. Use of commercial power necessitates connection of a commercial power line with the remote controllers, decreasing the freedom of installation. It is preferable that the remote controller 3 which is installed in the bath room 5 not be powered with the commercial power line, but rather be powered with a battery for safety reasons. Since humidity is relatively high in the kitchen 4 or the bath room 5 and the remote controllers 2 and 3 may easily get wet, the remote controllers 2 and 3 which are installed in such place should be humidity or water resistant. Reduction in power consumption of the transmitting and receiving devices of the remote controllers 2 and 3 which are powered with batteries has been strongly demanded in view of the frequency of battery exchange, size of the battery of the remote controllers 2 and 3 and humidity or water resistant structure of the remote controllers 2 and 3. The present invention can meet these demands. Although the present embodiment has been described with reference to a gas heated hot water supplying apparatus, the present invention can be easily adapted for hot water supplying apparatus using remote controllers for supplying hot water which is heated by other energy sources depending upon electric power or petroleum. Similar effects can be obtained.

Figure 2:
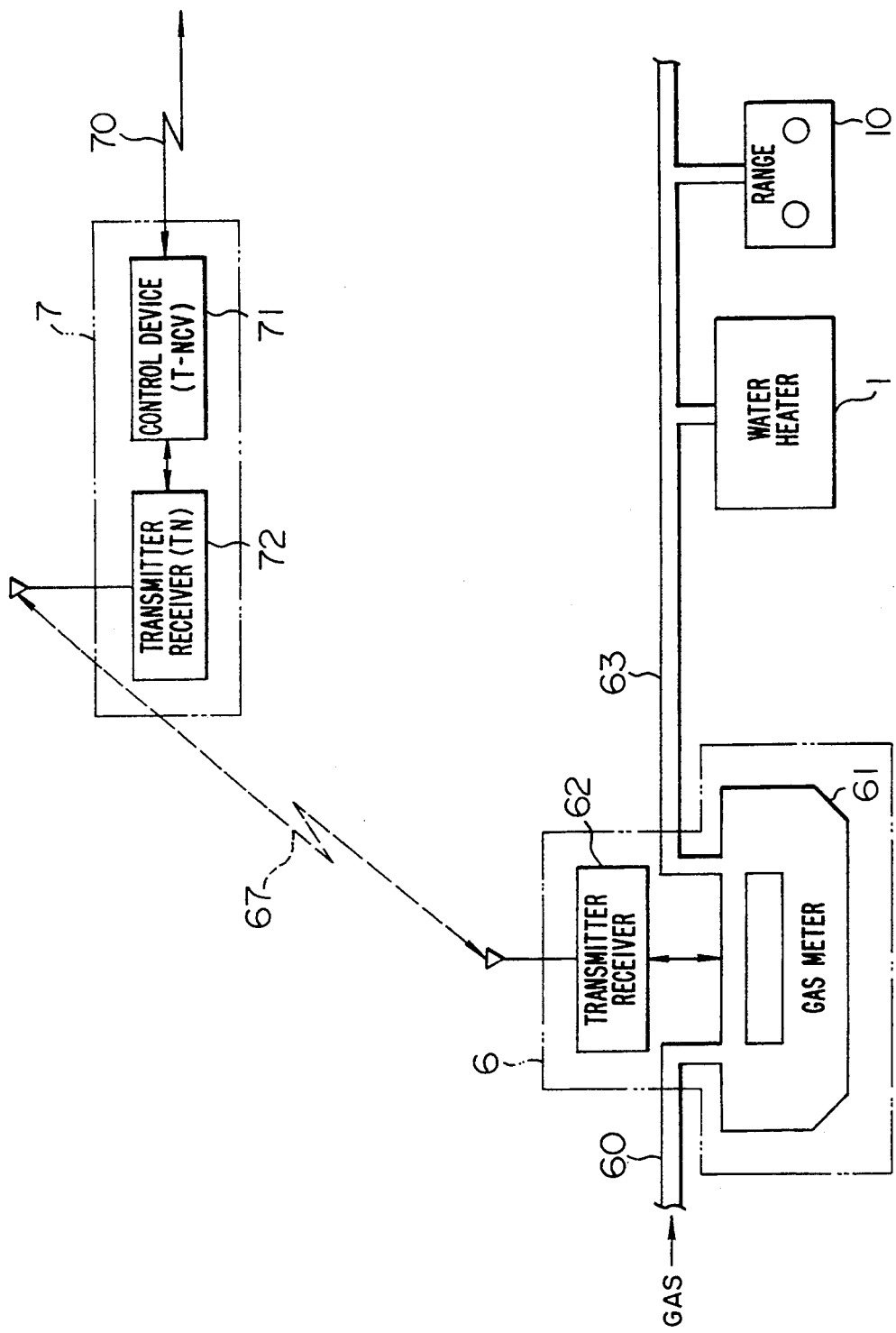
FIG. 2 is a schematic structural view showing a radio control apparatus in an automatic metering system in another embodiment of the present invention.

As shown in FIG. 2, a gas automatic metering system, which is another residential facility control system, comprises a metering terminal 6 which is a subsidiary apparatus and a radio frequency (RF) terminal network control device 7 which is a host apparatus. The metering terminal 6 comprises a gas meter 61 for metering fuel gas supplied from a gas supply pipe 60 and a low power consumption type metering transmitting and receiving device 62 which transmits metering data signals from the gas meter 61 to an RF terminal network control device 7 and receives radio signals from the RF terminal network control device 7. Gas which has passed through the gas meter 61 is supplied from a gas supply pipe 63 to gas appliances such as the gas heated hot water supplying apparatus 1 and a gas range 10. The RF terminal network control device 7 comprises a terminal network control unit (T-NCU) 71 which sends to the metering terminal 6 an instruction which is fed from a metering center via a telephone line 70 and sends data from the metering terminal 6 to the metering center via the telephone line 70 and a low power consumption type terminal network (TN) transmitting and receiving device 72 which receives data from the T-NCU 71 for transmitting it to the metering terminal 6 as a radio signal 67 and receives the radio signal 67 transmitted from the metering terminal 6 for sending data to the T-NCU 71. The RF terminal network control device 7 and the metering terminal 6 are usually disposed outdoors. If the RF terminal network control device 7 and the metering terminal 6 are powered with a commercial power, batteries are usually used for enabling the RF terminal network control device 7 and the metering terminal 6 to be used even upon the interruption of commercial power line. Since the present system is usually disposed outdoors, a water resistant structure is required similar to that used in remote controllers 2 and 3 of the above mentioned hot water supplying apparatus 1. When batteries are used as power sources and water resistant structures are provided, reduction in power consumption is required to decrease the frequency of changing batteries. Although the present invention has been described with reference to the embodiment in which the metering terminal is the gas meter, the present invention can be similarly embodied for an automatic metering system for other electric power meters, or water supply meters, or a system using radio waves and similar effects can be obtained.

An embodiment of the transmitting and receiving device of the present invention will be described with reference to FIGS. 3, 4 and 5.

Figure 3A:
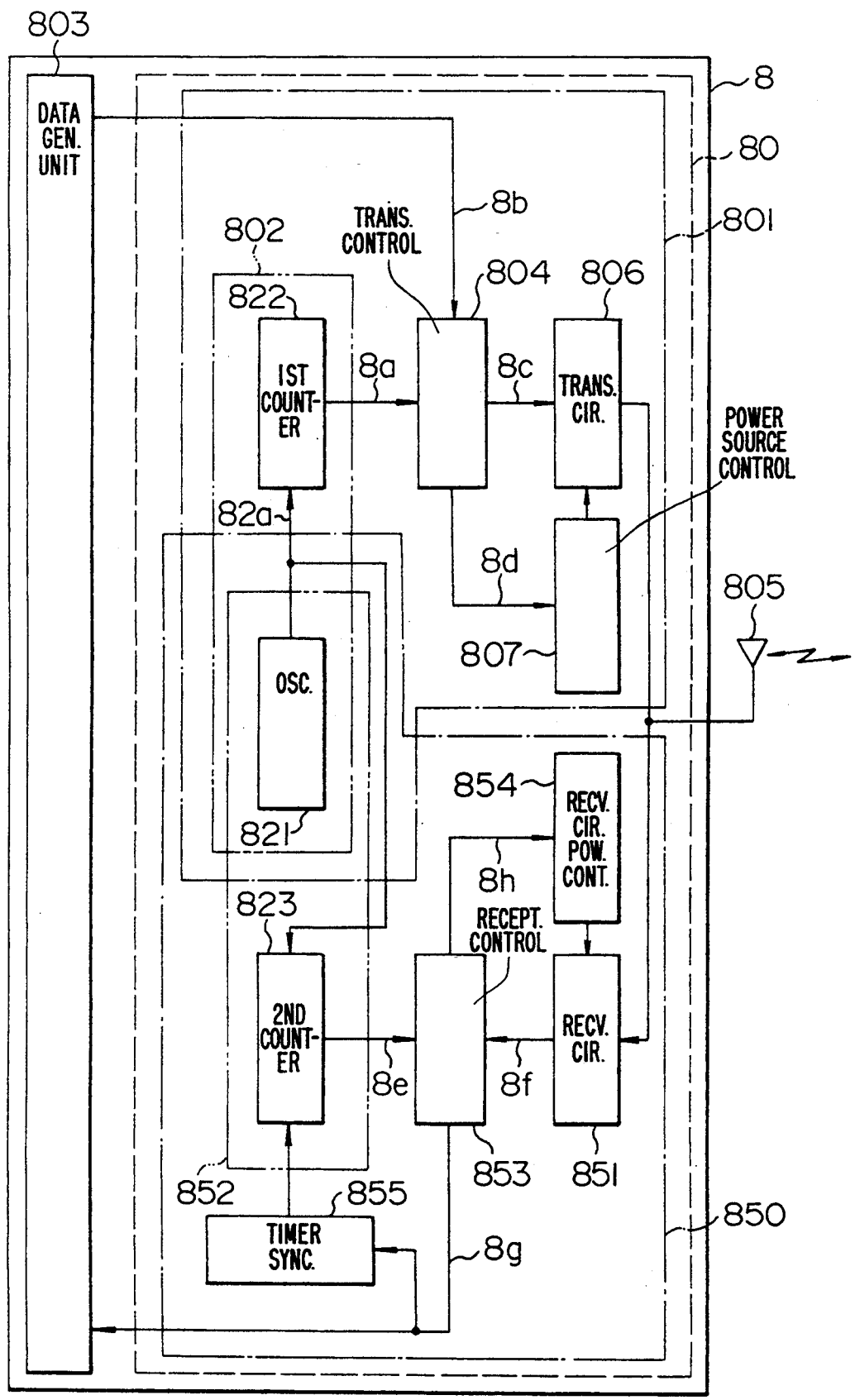
FIGS. 3A and 3B are block diagrams showing the transmitting and receiving device which is provided in host and subsidiary apparatus in the radio control apparatus for a residential facility control system shown in FIG. 1 or 2.
Figure 3B:
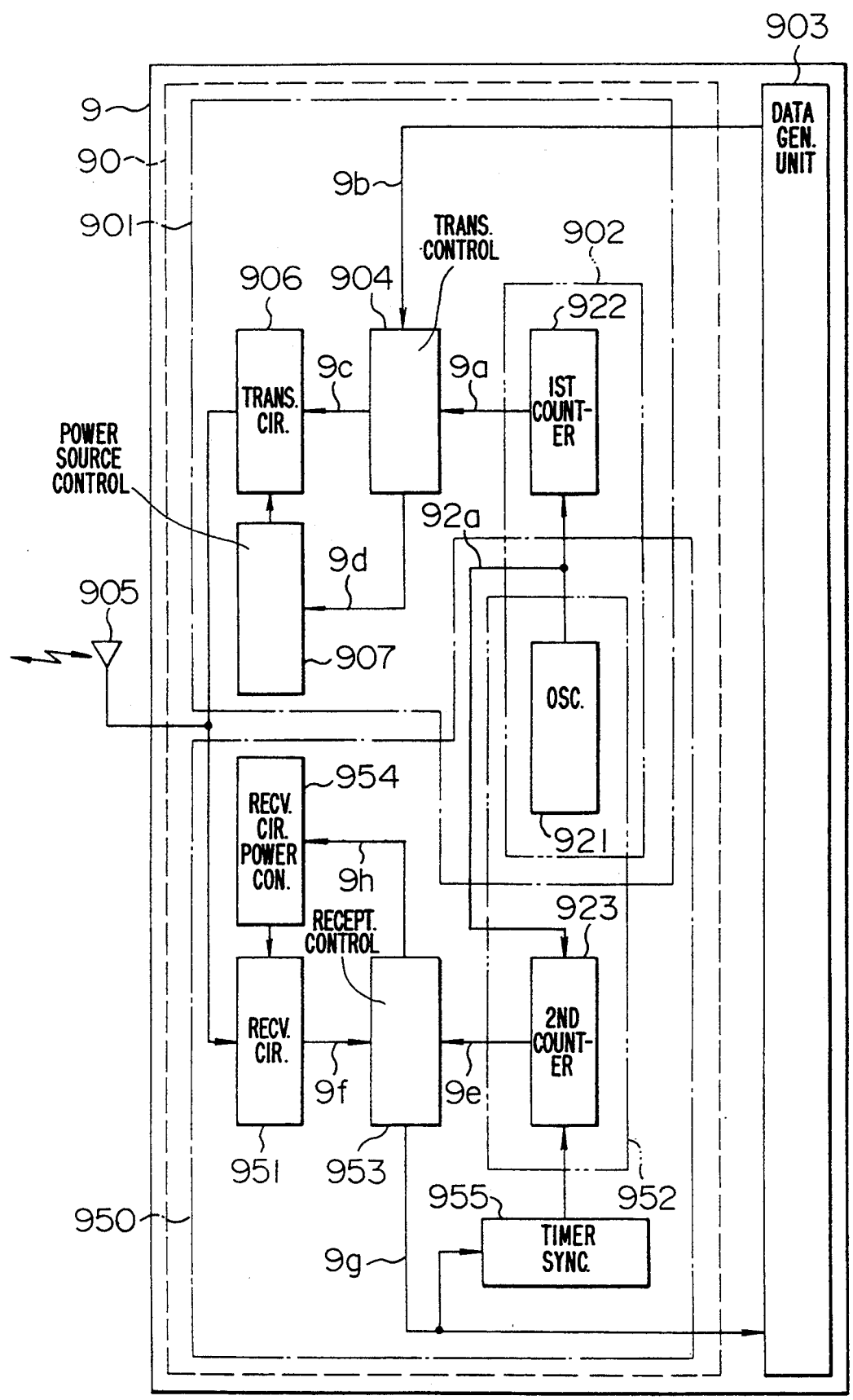

First, the structure of the transmitting and receiving device will be described with reference to FIGS. 3A and 3B. A transmitting and receiving device 80 of a host apparatus 8 such as the gas heated hot water supplying apparatus 1 or the RF terminal network control device 7 and a transmitting and receiving device 90 of the subsidiary apparatus 9 such as remote controller 2, 3 or metering terminal 6 are formed as follows: Transmitting device 801, 901 of the transmitting and receiving devices 80, 90 comprises first timer means 802, 902 for periodically outputting first timing signal 8a, 9a with predetermined period T80, T90; transmission data generating unit 803, 903 for generating data 8b, 9b which is to be transmitted from the host apparatus 8 to the subsidiary apparatus 9 and vice versa; transmission control means 804, 904 which starts transmission operation based upon said first timing signal 8a, 9a when it receives transmission data 8b, 9b from the transmission data generating unit 803, 903 and generates and outputs transmission signal 8c, 9c including transmission data 8b, 9b added with a preamble signal and a transmission error check code and outputs power source control signal 8d, 9d; transmitting circuit 806, 906 for transmitting transmission signal 8c, 9c as radio wave signal from antenna 805, 905; and power source control means 807, 907 for controlling the power supply to transmitting circuit 806, 906 in response to the power source control signal 8d, 9d, respectively. The transmission data 8b which is generated by the data generating unit 803 of the host apparatus is operation state monitor data, representative of whether the combustion unit is normally operated, if the host apparatus 8 is the gas heated hot water supplying apparatus 1 and is an instruction data, which is received by the RF terminal network control device 7 from the metering center, if the host apparatus 8 is the RF terminal network control apparatus 7. The data 9b which is generated by the data generating unit 903 of the subsidiary apparatus 9 is hot water temperature presetting data, for presetting the temperature of supplied hot water, if the subsidiary apparatus 9 is the remote controller 2 or 3 and is metering data from the gas meter 61 if the subsidiary apparatus 9 is the metering terminal 6.

The receiving device 850, 950 of the transmitting and receiving device 80, 90 comprises antenna 805, 905 for receiving transmitted radio wave; receiving circuit 851, 951 for receiving signal 8c, 9c transmitted from the transmitting device 801, 901 via the antenna 805, 905; second timer means 852, 952 for periodically outputting second timing signal 8e, 9e having period T85, T95 which is the period of the first timing signal 8a, 9a divided by an integer; reception control means 853, 953 which determines whether or not there is a reception signal 8f, 9f from the receiving circuit 851, 951 in synchronization with the second timing signal 8e, 9e for outputting reception data 8g, 9g to the data generating unit 803, 903 and output receiving circuit power source control signal 8h, 9h for controlling the power supply to the receiving circuit 851, 951 in response to the second timing signal 8e, 9e; receiving circuit power source control means 854, 954 for intermittently activating the receiving circuit 851, 951 by intermittently powering the receiving circuit 851, 951 in response to the receiving circuit power source control signal 8h, 9h; timer synchronization means 855, 955 for adjusting the phase difference between two timing signals by starting the second timer means 852, 952 in response to a first signal transmitted from the host or subsidiary apparatus 8 or 9, respectively.

The first timer means 802, 902 and the second timer means 852, 952 of the receiving and transmitting device 80 or 90 of the host or subsidiary apparatus 8 or 9 are formed as follows: In the host apparatus 8, an oscillator 821 which outputs a signal 82a having a predetermined period T8 are commonly used by the first and second timer means 802 and 852. The first timer means 802 comprises this oscillator 821 and a first counting means 822 which counts the signals 82a from the oscillator 821 and outputs a first timing signal 8a when the count reaches a predetermined value and initializes the count on the next operation after the count reaches the maximum value N1. The second timer means 852 comprises the oscillator 821 and a second counting means 823 which counts the signals 82a from the oscillator 821 and outputs a second timing signal 8e when the count reaches a predetermined value and initializes the count on the next operation after the count reaches the maximum value N2. In the subsidiary apparatus 9, an oscillator 921 which outputs a signal 92a having a predetermined period T9 are commonly used by the first and second timer means 902 and 952. The first timer means 902 comprises this oscillator 921 and a first counting means 922 which counts the signals 92a from the oscillator 921 and outputs a first timing signal 9a when the count reaches a predetermined value and initializes the count on the next operation after the count reaches the maximum value N3. The second timer means 952 comprises the oscillator 921 and a second counting means 923 which counts the signals 92a from the oscillator 921 and outputs a second timing signal 9e when the count reaches a predetermined value and initializes the count on the next operation after the count reaches the maximum value N4.

Since separate transmitting and receiving antennae are commonly used, the single antenna 805 or 905 used in the present embodiment, may be provided as two antennae. Although the first timer means 802 or 902 and the second timer means 852 or 952 commonly use the oscillator 821 or 921, respectively, the first timer means 802 or 902 may be provided independently of the second timer means 852 or 952.

Figure 4:
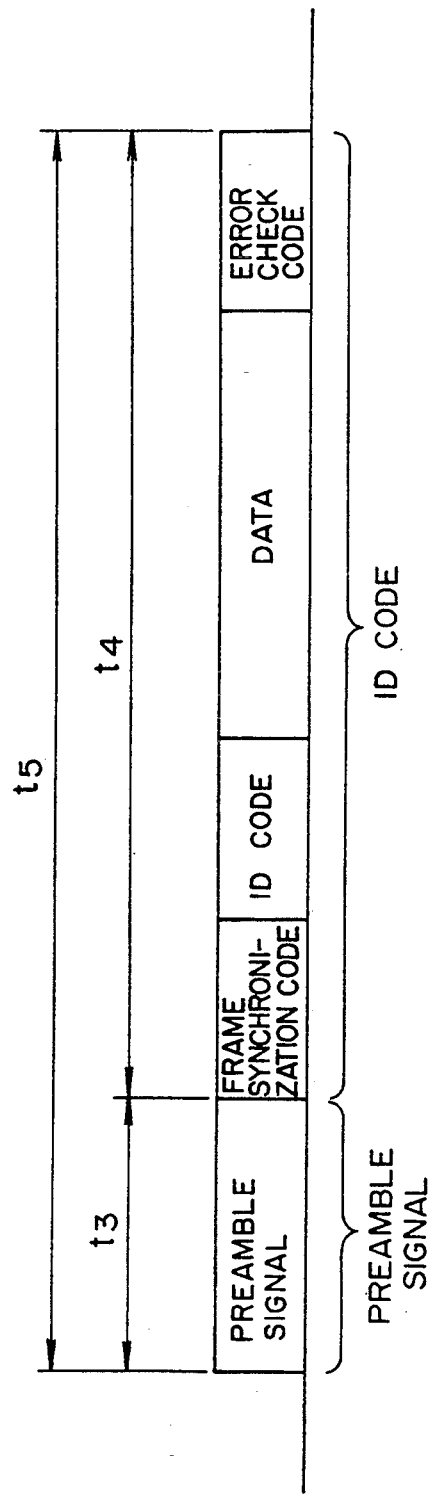
FIG. 4 is a time slot diagram showing a transmission signal.

Examples of the time slot format of the transmission signals 8c or 9c which is generated by the transmission control means 804 or 904 is shown in FIG. 4. As shown in FIG. 4, the transmission signal 8c or 9c comprises a preamble signal having a length of t3 for notification of the existence of the transmitting signal 8c, 9c, a frame synchronization code for achieving frame synchronization, an ID code for identifying transmission source and transmission destination, a transmission data 8b, 9b and an error check code. The transmission signal 8c, 9c has a predetermined length of t5.

Operation of the above mentioned embodiment will now be described with reference to FIGS. 5A to 5F. Firstly, transmission of the transmission data 8b from the host apparatus 8 to the subsidiary apparatus 9 will be described. If the transmission data generating unit 803 of the host apparatus 8 generates the data 8b to be transmitted (at point A of FIG. 5A), the transmission control means 804 generates and outputs (FIG. 5C) the transmission data signal 8c including the transmission data 8b, (which is added with the preamble signal and the transmission error check code) in synchronization with the first timing signal 8a (having a predetermined period T80 as shown in FIG. 5B) and outputs the power source control signal 8d. The power source control means 807 supplies the transmitting circuit 806 with power for a period of time which is taken for the transmitting circuit 806 to transmit the transmission data signal 8c having the time length t5 from the antenna 805 as a radio wave signal.

Operation of the receiving device 950 of the transmitting and receiving device 90 of the subsidiary apparatus 9 which receives the transmitted radio wave signal will now be described. The second timer means 952 periodically outputs the second timing signal 9e having the same period T95 as the period T80 of the first timing signal 8a (FIG. 5D). The reception control means 953 outputs the receiving circuit power source control signal 9h for initiating power supply to the receiving circuit 951 in synchronization with the second timing signal 9e (FIG. 5E). The receiving circuit power source control means 954 supplies the receiving circuit 951 with power in response to the receiving circuit power source control signal 9h. This receiving circuit power source control signal 9h activates the receiving circuit power source control means 954 to supply power to the receiving circuit 951 for only a predetermined period of time (t1) which is equal to or shorter than the preamble signal length (t3) if there is not a reception signal 9f from the receiving circuit 951. Accordingly, the receiving circuit 951 is substantially activated for the time (t1) with the period of T95. If the transmission signal 8c is incoming from transmitting device 80 as a radio wave signal when the receiving circuit 951 is activated, the receiving circuit 951 receives the signal via the antenna 905. The reception control means 953 outputs the receiving circuit power source control signal 9h for keeping power supply to the receiving circuit 951 for only the period of time which is necessary to receive the transmission signal 8c having the time length t5 in response to the reception signal 9f from the receiving circuit 951. Further, the reception control means 953 outputs the transmission data 8b of the host apparatus 8 included in the reception signal 9f as a reception data 9g (at point B of FIG. 5F) when it determines from the ID code and error check code that the reception signal 9f is a signal transmitted to the reception control means 95 and error free, that is, an effective signal. Synchronization between transmission and reception by the transmitting and receiving devices 80 and 90 of the host and subsidiary apparatus 8 and 9 can be easily achieved by initiating the second timer means 852, 952 based upon the first signal transmitted from the host or subsidiary apparatus 8 or 9 for adjusting the phase difference between two timing signals.

Transmission of the transmission data 9b from the subsidiary apparatus 9 to the host apparatus 8 is conducted similarly to the operation between the transmitting device 90 of the subsidiary apparatus 9 and the receiving device 850 of the host apparatus 8 as mentioned above.

In the present embodiment, the period T80 of the first timing signal 8a is equal to the period T95 of the second timing signal 9e and the period T90 of the first timing signal 9a is equal to the period T85 of the second timing signal 8e, that is, T80=T95 and T90=T85.

Synchronization between transmission and reception can be generally achieved if the period T85, T90 of the second timing signals 8e, 9e is preset to the period T80, T95 of the first timing signals 8a, 9a which is divided by an integer (T95=T80/K1 and T85=T90/K2 wherein K1 and K2 are integers). K1 and K2 are preset to one (1) in the present embodiment. In case of Ki=1 and K2=1, the frequency of power supplies to the receiving circuit per unit time is least, resulting in the largest reduction in power consumption.

The first timer means 802 or 902 and the second timer means 852 or 952 comprises the oscillator means 821 or 921 and the counter means 822, 823 or 922, 923. The period T8 of the signal 82a from the oscillator 821 may be equal to or different from the period T9 of the signal 92a from the oscillator 921. The reason is that a desired timing period can be obtained by properly presetting the count of the counting means 822, 823, 922, 923 even if the periods are different.

Since the power source control means 807 supplies power to the transmitting circuit 806 for only a period of time which is necessary for the transmitting circuit 806 to transmit the transmission signal 8c having a time length t5 as a radio signal from the antenna 805 in the present embodiment, consumption power can be reduced in comparison with a system in which power is always supplied. The receiving circuits 851, 951 of the receiving device 850, 950 are normally periodically powered for only a short period of time (t1) and are powered for a period of time which is necessary to receive the transmission signals 8c, 9c only when there are reception signals 8f or 9f. Accordingly, power consumption can be reduced in comparison with that of an apparatus which is normally powered. As a result of reduction in power consumption, necessary power capacity may be made lower and the apparatus can be made smaller. If batteries are used as a power source, the frequency of exchanges of the batteries can be reduced. Residential facility control systems which do not need battery exchange for the service time of the apparatus can be provided. In this case, the apparatus can be of hermetically sealed structure, for example, so that it is humidity and water resistant.

Figure 6A:
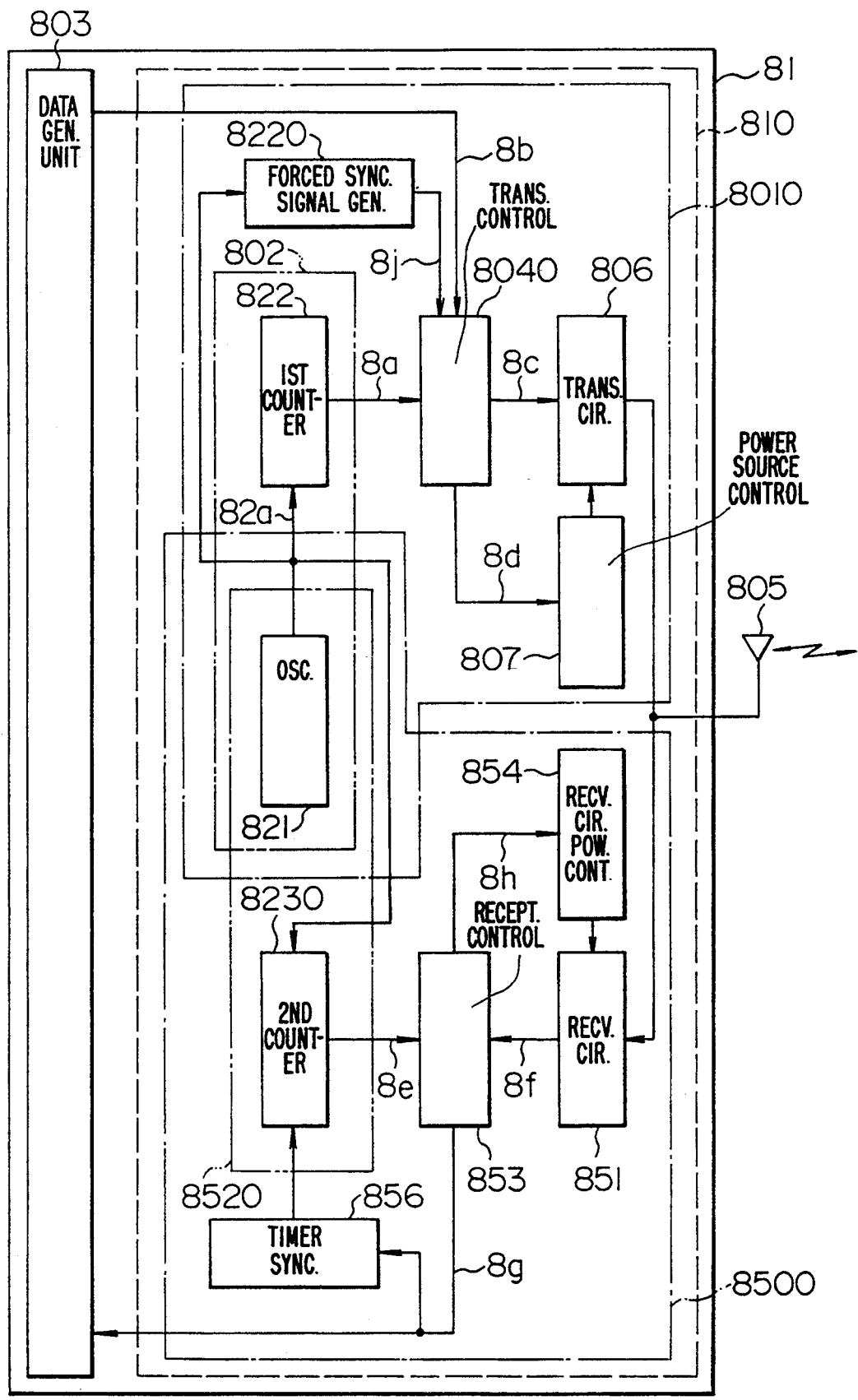
FIGS. 6A and 6B are block diagrams showing the transmitting and receiving device in a further embodiment of the present invention.
Figure 6B:
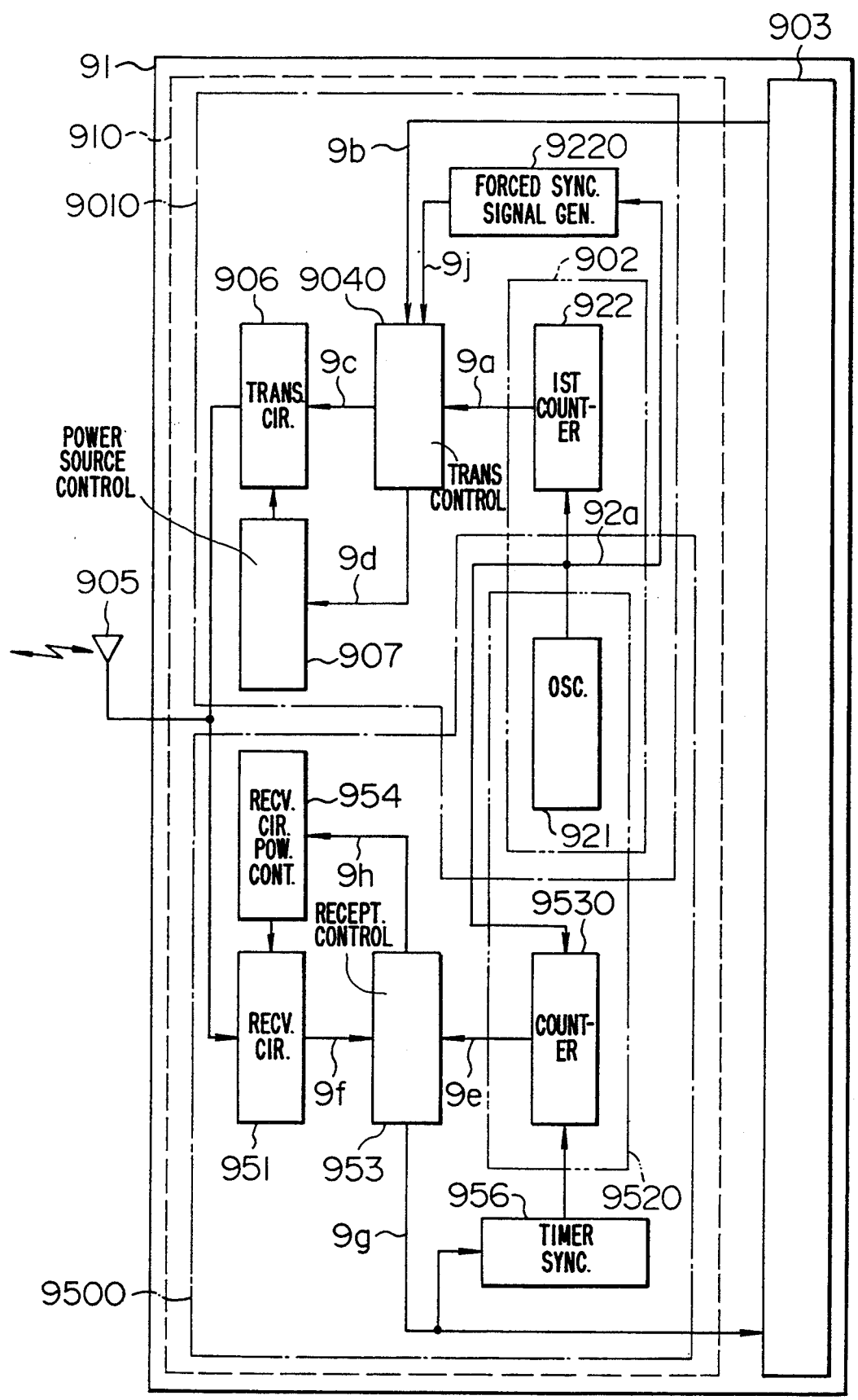

Another embodiment of the present invention will be described with reference to FIGS. 6A and 6B. A receiving device 8500, 9500 of transmitting and receiving device 810, 910 of host apparatus 81 and subsidiary apparatus 91 of a control system of a residential facility system shown in FIGS. 6A and 6B is substantially identical with the receiving device 850, 950 of the transmitting and receiving device 80, 90 shown in FIG. 3 except that there is added timer synchronizing means 856, 956 which starts its operation in response to a reception data 8g, 9g from reception control means 853, 953 for initializing second timer means 8520, 9520 after a predetermined period of time. A transmitting device 8010, 9010 is substantially identical with the transmitting device 801, 901 of FIG. 3 except that there is added forced synchronization signal generating means 8220, 9220 for periodically outputting to transmission control means 8040, 9040 a forced synchronization signal 8j, 9j for the synchronization between transmission and reception. The forced synchronization signal generating means 8220, 9220 comprises an oscillator 821, 921 and third counting means (not shown) 8220, 9220 which counts the signals 82a, 92a from the oscillator 821, 921 and outputs the forced synchronization signal 8j, 9j when the count reaches a predetermined value and initializes third counting means for initializing the count in next counting operation after the count reaches a preset value N5, N6, respectively. Although the forced synchronization signal generating means 8220, 9220 commonly uses the oscillator 821, 921 together with the first timer means 802, 902 and the second timer means 8520, 9520, respectively, they may be entirely separately provided.

Operation of the embodiment will be described with reference to FIG. 7. A case in which the transmission data 8b is transmitted from the host apparatus 81 to the subsidiary apparatus 91 will be described. When the transmission data generating unit 803 of the host apparatus 81 generates the data 8b to be transmitted (at point A of FIG. 7A), the transmission control means 8040 generates and outputs (FIG. 7C) the transmission signal 8c including the transmission data 8b added with the preamble signal and the transmission error check code in synchronization with the first timing signal 8a having a predetermined period T80 (shown in FIG. 7B). Reference numerals t6, t5 and t7 denote the time which are taken since the first timing signal 8a(3) is output until the transmission signal 8c is output, the time length of the transmission signal 8c and the time which is taken since the transmission signal 8c is completed until the next first timing signal 8a(4) is output, respectively. The transmission control means 8040 outputs the power source control signal 8d in synchronization with the first timing signal 8a having a predetermined period T80. The power source control means 807 supplies power to the transmitting circuit 806 for a period of time which is necessary for the transmitting circuit 806 to transmit the transmission signal 8c having the time length t5 as a radio wave signal from the antenna 805.

Operation of the receiving device 9010 of the transmission and receiving device 910 of the subsidiary apparatus 91 which receives the transmitted incoming radio wave signal will be described. The second timer means 9520 periodically outputs a second timing signal 9e having a period T95 which is the same as the period T80 of the first timing signal 8a (FIG. 7D). The reception control means 953 outputs a receiving circuit power source control signal 9h for initiating power supply to the receiving circuit 951 in synchronization with the first timing signal 9e (FIG. 7E). The receiving circuit power source control means 954 supplies power to the receiving circuit 951 in response to a receiving circuit power source control signal 9h. This receiving circuit power source control signal 9h activates the receiving circuit power source control means 954 to supply power to the receiving circuit 951 for only a period of time (t1) which is equal to or shorter than the preamble signal length (t3) where there is no receiving signal 9f from the receiving circuit 951. Accordingly, the receiving circuit 951 is activated for a substantially predetermined period of time (t1) with the period T95. If the transmission signal 8c is transmitted as a radio wave signal from the transmitting circuit 8040 when the receiving circuit 951 is activated, the receiving circuit 951 receives it via the antenna 905. In response to the reception signal 9f from the receiving circuit 951, the reception control means 953 outputs the receiving circuit power source control signal 9h for maintaining power supply to the receiving circuit 951 for only a period of time which is necessary to receive the transmission signal 8c having the time length t5. The reception control means 953 outputs the transmission data 8b of the host apparatus 81 included in the reception signal 9f as reception data 9g (at point B of FIG. 7F) when it determines from the ID code and the error check code that the reception signal 9f is a signal transmitted to the reception control means 953 and an error free, that is, effective signal.

Although the normal values of the two timing signals are identical with each other as mentioned above, there is always variations therebetween. Accordingly, the phase difference t2 between the first and second timing signals 8a and 9e will be changed. In FIGS. 7A-7F, the ideal phase difference t2 between two timing signals is obtained, for example, in the relationship between the first and second timing signals 8a(1) and 9e(1) or when the leading edge of the transmission signal 8c' (shown with dashed lines in FIG. 7c) is positioned in the midpoint of the interval t1 for which the receiving circuit 951 is activated. If the two timing signals are shifted in phase, phase shift t8 between the midpoint of t1 and the leading edge of the transmission signal 8c will occur as shown in the relationship between the first and second timing signals 8a(3) and 9e(3). If the phase shift t8 becomes (t$\frac{1}{2}$) or more, the receiving device 9500 will be unable to receive the transmission signal from the transmitting device 8010. If the reception data 9g is output from the reception control means 953, the timer synchronization means 956 receives the reception data 9g for counting a predetermined fixed time t9 and outputs a timer synchronization signal to the second timer means 9520. Counting means 9530 of the second timer means 9520 is initialized by the timer synchronization signal to recover the phase difference between the first and second timing signals 8a(4) and 9e(4) to the ideal t2 again. Since the time t7 since the transmission signal is terminated until next first timing signal 8a(4) is output is determined by (T80-t5-t6) and the phase difference t2 between the first and second timing signals 8a and 9e is a design value, necessary fixed time t9 can be uniquely determined by (t7-t2).

If the transmission data generating unit 803, 903 of the host or subsidiary apparatus 81, 91 generates the data 8a, 9a to be transmitted at such intervals that the above mentioned out-of-synchronization is not occurred, synchronization can be achieved by the timer synchronization means 856, 956 on each reception. If the transmission data generating unit 803, 903 generates the data 8a, 9a to be transmitted after the lapse of the interval so that the above mentioned out-of-synchronization occurs, synchronization can not be achieved by the timer synchronization means 856,956. Therefore, the forced synchronization signal generating means 8220, 9220 provided in the transmitting device 8010, 9010 regularly outputs a forced synchronization signal 8j, 9j to the transmission control means 8040, 9040 at such intervals that the out-of-synchronization due to accumulation of the differences of the first timing signal 8a, 9a and the second timing signal 9e, 8e does not occur. The transmission control means 8040, 9040 transmits this signal to the receiving device 9500, 8500 as the transmission data 8a. The receiving device 9500, 8500 receives the transmission data so that the timer synchronization means 956, 856 initializes a counter unit 9530, 8230 of the second timer means 9520, 8520. This causes the phase difference between the first timing signal 8a, 9a and the second timing signal 9e, 8e to recover to ideal t2 again, so that synchronization is attained.

The transmission data 9b is transmitted from the subsidiary apparatus 91 to the host apparatus 81 similarly to the description of the transmission between the transmitting device 9010 of the subsidiary apparatus 91 and the receiving device 8500 of the host apparatus 81.

Also in the present embodiment, the period T80 of the first timing signal 8a is equal to the period T95 of the second timing signal 9e and the period T90 of the first timing signal 9a is equal to the period T85 of the second timing signal 8e, that is, T80=T95 and T90=T85. Synchronization between transmission and reception can be generally achieved if the period T85, T95 of the second timing signal 8e, 9e is preset to the period T80, T90 of the first timing signal 8a, 9a which is divided by an integer (T95=T80/K1 and T85=T90/K2 wherein K1 and K2 are integers). K1 and K2 are preset to one in the present embodiment. In case of K1=1 and K2=1, the frequency of power supplies to the receiving circuit per unit time is least, resulting in the largest reduction in power consumption.

Although transmitting devices 8010 and 9010 of the host and subsidiary apparatus 81 and 91 are provided with forced synchronization signal generating means 8220, 9220 in the present embodiment, it suffices to provide either one of the transmitting devices with the forced synchronization signal generating means. The reason is that an answer back signal is transmitted from the subsidiary apparatus 91 to the host apparatus 81 if the transmission signal 8c is transmitted from the host apparatus 81 to the subsidiary apparatus 91 and an answer back signal is transmitted from the subsidiary apparatus 91 to the host apparatus 81 in the transmitting and receiving device having a so-called answer back capability of notifying the transmitting side of the reception on each reception.

As mentioned above, synchronization between the first timing signal 8a, 9a and the second timing signal 9e, 8e can be achieved by the timer synchronization means 856, 956 on each reception in accordance with the present invention in addition to the effects of the embodiment of FIG. 3. Further, synchronization between the first timing signal 8a, 9a and the second timing signal 9e, 8e can be forcedly achieved by the forced synchronization signal generating means 8220, 9220 at such time intervals such that out-of-synchronization due to accumulation of differences of the first timing signal 8a, 9a and the second timing signal 9e, 8e does not occur.

Although embodiments have been described with reference to residential facility control systems including host and subsidiary apparatus, the transmitting and the receiving device which is used for the residential facility control system can be widely used for mount low power consuming transmitting and receiving device if the length of the transmission signal can be specified. The transmitting and receiving device of the subsidiary apparatus in which the power source is a battery is particularly preferable because of the low power consumption.

We claim:

1. A residential facility control system having a radio control capability comprising a host and a subsidiary apparatus;
    said host apparatus including:
    first timer means for periodically outputting a first timing signal having a predetermined period;
    a transmission data generating unit for generating transmission data;
    transmission control means for starting a transmission operation based upon said first timing signal in response to the transmission data, and for outputting a transmission signal and a power source control signal;
    a transmitting circuit for converting the transmission signal to a radio signal;
    transmitting antenna means for transmitting the radio signal generated by said transmitting circuit; and
    transmitting circuit power source control means for controlling a power supply to said transmitting circuit in response to said power source control signal;
    said subsidiary apparatus including:
    receiving antenna means for receiving the radio signal which is transmitted from said transmitting antenna means;
    a receiving circuit for receiving the radio signal from the receiving antenna means and converting it to a reception signal;
    second timer means for periodically outputting a second timing signal having a period which is substantially equal to the predetermined period of said first timing signal divided by an integer;
    reception control means for determining whether or not there is the reception signal from said receiving circuit and to output reception data in synchronization with said second timing signal and to output a receiving circuit power source control signal to control a further power supply to said receiving circuit in response to said second timing signal; and
    receiving circuit power source control means for intermittently activating said receiving circuit by intermittently turning on said further power supply to said receiving circuit in response to said receiving circuit power source control signal.

2. A residential facility control system as defined in claim 1 in which the further power source for intermittently activating said receiving circuit power source control means of said subsidiary apparatus is a battery.

3. A residential facility control system as defined in claim 1 in which said subsidiary apparatus further includes instruction signal transmitting means for transmitting a plurality of predetermined instruction signals each corresponding to an operation of a user.

4. A residential facility control system as defined in claim 1 in which at least one of the host and the subsidiary apparatus further includes timer synchronization means for matching the phase difference between said first and said second timing signals to synchronize reception of the reception signal with transmission of the transmission signal.

5. A residential facility control system as defined in claim 1 in which the predetermined period of said first timing signal is substantially the same as the period of said second timing signal.

6. A residential facility control system as defined in claim 4 in which said timer synchronization means initializes the second timer means a predetermined time after it receives the reception data from said reception control means to start its operation.

7. A residential facility control system as defined in claim 1 in which at least one of said host and said subsidiary apparatus includes forced synchronization signal generating means for periodically outputting to said transmission control means a forced synchronization signal for synchronizing reception of the reception signal with transmission of the transmission signal.

8. A residential facility control system as defined in claim 3 in which at least one of said host and said subsidiary apparatus includes forced synchronization signal generating means for periodically outputting to said transmission control means a forced synchronization signal for synchronizing reception of the reception signal with transmission of the transmission signal.

* * * * *